(12) United States Patent
Buffett-Kennedy

(10) Patent No.: US 12,432,404 B1
(45) Date of Patent: Sep. 30, 2025

(54) SYSTEM AND METHOD FOR ENABLING AND FACILITATING THE DELIVERY OF AUDIO-VISUAL CONTENT TO A GROUP OF PEOPLE

(71) Applicant: Noah Buffett-Kennedy, Omaha, NE (US)

(72) Inventor: Noah Buffett-Kennedy, Omaha, NE (US)

( * ) Notice: Subject to any disclaimer, the term of this patent is extended or adjusted under 35 U.S.C. 154(b) by 0 days.

(21) Appl. No.: 18/673,868

(22) Filed: May 24, 2024

Related U.S. Application Data

(60) Provisional application No. 63/468,673, filed on May 24, 2023.

(51) Int. Cl.
*H04N 21/258* (2011.01)
*H04N 21/488* (2011.01)
*H04N 21/81* (2011.01)

(52) U.S. Cl.
CPC ... *H04N 21/25841* (2013.01); *H04N 21/4884* (2013.01); *H04N 21/8106* (2013.01)

(58) Field of Classification Search
CPC ......... H04N 21/25841; H04N 21/4884; H04N 21/8106
See application file for complete search history.

(56) References Cited

U.S. PATENT DOCUMENTS

| | | | | |
|---|---|---|---|---|
| 4,570,232 A * | 2/1986 | Shikano | ................ | G10L 15/12 704/241 |
| 5,598,557 A * | 1/1997 | Doner | ................ | G06F 16/3346 707/999.005 |
| 6,085,160 A * | 7/2000 | D'hoore | ................ | G10L 15/005 704/277 |
| 6,098,082 A * | 8/2000 | Gibbon | ................ | G06F 16/739 715/255 |
| 6,442,518 B1 * | 8/2002 | Van Thong | ............ | G10L 15/26 704/235 |
| 6,473,778 B1 * | 10/2002 | Gibbon | ................ | G06F 40/103 715/201 |
| 7,035,468 B2 * | 4/2006 | Yogeshwar | ............ | G06F 16/71 707/E17.031 |
| 7,047,191 B2 * | 5/2006 | Lange | .................... | G10L 15/26 704/235 |
| 7,065,524 B1 * | 6/2006 | Lee | ....................... | G16H 50/50 706/45 |
| 7,092,888 B1 * | 8/2006 | McCarthy | .......... | G10L 15/1822 704/277 |

(Continued)

*Primary Examiner* — Michael B. Pierorazio
(74) *Attorney, Agent, or Firm* — Suiter Swantz IP

(57) ABSTRACT

The system includes a server coupled to a host device and one or more user devices. The server is configured to receive an audio-visual work in a digital container with a video container and an audio container. The server is further configured to identify a host device and one or more user devices and transmit the video container to the host device and the audio container to the one or more user devices. The server is configured to determine whether the identified host device is a presenting device and whether the one or more identified user devices are attendee devices. The server also is configured to generate control signals configured to cause the presenting device to display the video file and generate one or more control signals configured to cause the one or more attendee devices to generate audio corresponding to the audio file.

22 Claims, 9 Drawing Sheets

(56) References Cited

U.S. PATENT DOCUMENTS

| | | | | |
|---|---|---|---|---|
| 7,110,664 B2* | 9/2006 | Yogeshwar | H04N 5/76 | 386/328 |
| 7,509,385 B1* | 3/2009 | Rittmeyer | G06Q 10/107 | 715/224 |
| 7,739,253 B1* | 6/2010 | Yanovsky | G06F 16/9535 | 707/706 |
| 7,761,892 B2* | 7/2010 | Ellis | H04N 21/2143 | 725/86 |
| 7,908,628 B2* | 3/2011 | Swart | H04N 21/6377 | 725/135 |
| 8,131,545 B1* | 3/2012 | Moreno | G10L 15/04 | 704/235 |
| 8,209,724 B2* | 6/2012 | Rathod | H04N 21/435 | 348/715 |
| 8,248,528 B2* | 8/2012 | Hosking | H04N 7/165 | 725/62 |
| 11,228,810 B1* | 1/2022 | Arazi | H04N 21/6582 | |
| 2002/0055950 A1* | 5/2002 | Witteman | G06F 16/40 | 707/E17.009 |
| 2002/0093591 A1* | 7/2002 | Gong | H04N 21/2368 | 348/E7.063 |
| 2003/0025832 A1* | 2/2003 | Swart | H04N 21/4828 | 348/E7.071 |
| 2003/0061028 A1* | 3/2003 | Dey | G06F 16/40 | 704/9 |
| 2003/0169366 A1* | 9/2003 | Lenzi | H04N 7/10 | 348/461 |
| 2003/0206717 A1* | 11/2003 | Yogeshwar | G11B 27/10 | 386/328 |
| 2004/0096110 A1* | 5/2004 | Yogeshwar | G06F 16/51 | 707/E17.031 |
| 2005/0227614 A1* | 10/2005 | Hosking | H04N 7/165 | 455/3.06 |
| 2006/0015339 A1* | 1/2006 | Charlesworth | G10L 15/187 | 704/E15.02 |
| 2007/0124147 A1* | 5/2007 | Gopinath | G10L 15/19 | 704/E15.021 |
| 2007/0124788 A1* | 5/2007 | Wittkoter | H04N 7/165 | 348/E7.071 |
| 2008/0066138 A1* | 3/2008 | Bishop | G06F 40/58 | 725/137 |
| 2008/0262996 A1* | 10/2008 | Yogeshwar | G06F 16/71 | 707/E17.031 |
| 2008/0266449 A1* | 10/2008 | Rathod | H04N 21/8133 | 348/E7.001 |
| 2009/0087161 A1* | 4/2009 | Roberts | G11B 27/28 | 386/285 |
| 2009/0171662 A1* | 7/2009 | Huang | G10L 15/1822 | 704/E15.041 |
| 2012/0192242 A1* | 7/2012 | Kellerer | G06F 16/787 | 725/116 |
| 2019/0246171 A1* | 8/2019 | Gefen | H04N 21/4728 | |
| 2019/0303797 A1* | 10/2019 | Javali | G10L 15/22 | |
| 2022/0059082 A1* | 2/2022 | Saon | G06F 17/18 | |
| 2022/0093103 A1* | 3/2022 | Shin | G10L 15/22 | |
| 2022/0223066 A1* | 7/2022 | Chen | G10L 15/16 | |
| 2023/0209015 A1* | 6/2023 | Jinnouchi | H04N 23/661 | 348/723 |
| 2023/0345082 A1* | 10/2023 | Doken | H04N 21/4884 | |

* cited by examiner

SYSTEM AND METHOD FOR ENABLING AND FACILITATING THE DELIVERY OF AUDIO-VISUAL CONTENT TO A GROUP OF PEOPLE

CROSS-REFERENCE TO RELATED APPLICATIONS

The present application claims the benefit of U.S. Provisional Patent Application Ser. No. 63/468,673, filed on May 24, 2023, which is incorporated herein by reference in the entirety.

TECHNICAL FIELD

The present disclosure generally relates to the distribution of audio-visual content, and more particularly, to a system and method for enabling and facilitating delivery of audio-visual content to a group of people.

BACKGROUND

It is commonplace for viewers to watch a movie at a movie theatre in which each individual purchases a ticket to view the movie at the movie theatre facility and that ticket is checked by an employee before the viewer is allowed in the enclosed theatre.

In general, at the present time most movie theaters are no longer popular places to enjoy movies. There are numerous problems with the movie theater industry, the first being access to a movie theatre. For example, according to Statista.com, in 1996 there were 7,798 cinema sites in the United States. In 2020, that number decreased to 5,798. For many people in America, and throughout the world, just getting to a movie theater can take a lot of time. Those that make it to a movie theater find them to be almost identical to each other, confronted by the same problems: an uninviting building, uncomfortable seats, over-priced tickets, unhealthy and over-priced food, only a limited number of movies to choose from, and a venue that is either nearly empty or, on the rare occasion of a blockbuster film, too busy to attend.

The problems inherent in the current movie theater industry model are not only suffered by audience members. Content owners (such as media companies and independent film makers) are harmed as well. Often, independent movie makers are not able to have their movies shown in public because they lack the financial resources to market their movie and the professional connections to the movie theater industry to get their movies distributed. The profitability of most major motion pictures is also negatively affected, because consumers choose to avoid the movie theaters they once loved to attend.

Nearly all the problems with movie theaters relate to the physical structure of theaters. A means for people to enjoy movies together in the places they enjoy being in way that helps support and grow the content creators and content owners is needed. As such, there is a need for a method and system for facilitating delivery of audio-visual content to a group of people.

SUMMARY

A system is disclosed, in accordance with one or more embodiments of the present disclosure. In embodiments, the system includes a server communicatively coupled to a host device and one or more user devices. The server is configured to receive an audio-visual work in a digital container, wherein the digital container includes a video container and an audio container. The server is configured to separate the video container from the audio container, and the audio container from the video container, so either container may be downloaded independently of the other. The server is further configured to identify a host device and transmit the video container to the host device. Likewise, the server is configured to identify one or more user devices and transmit the audio container to the one or more identified user devices. The server is configured to determine whether the identified host device is a presenting device by comparing a geographic location of the host device to the location data of a host digital signature and comparing a local time of the host device to the time data of the host digital signature. Similarly, the server is configured to determine whether the one or more identified user devices are attendee devices by comparing a geographic location of the one or more user devices to the location data of a user digital signature and comparing a local time of the user device to the time data of the user digital signature. The server is configured to generate one or more control signals configured to cause the presenting device to display the video file and generate one or more control signals configured to cause the one or more attendee devices to generate audio corresponding to the audio file simultaneously with the video file on the presenting device.

A method is disclosed, in accordance with one or more embodiments of the present disclosure. In embodiments, the method includes system includes receiving an audio-visual work in a digital container, wherein the digital container includes a video container and an audio container. In embodiments, the method includes identifying a host device and transmitting the video container to the host device, identifying one or more user devices and transmitting the audio container to the one or more identified user devices. In embodiments, the method includes determining whether the identified host device is a presenting device by comparing a geographic location of the host device to the location data of a host digital signature and comparing a local time of the host device to the time data of the host digital signature. In embodiments, the method includes determining whether the one or more identified user devices are attendee devices by comparing a geographic location of the one or more user devices to the location data of a user digital signature and comparing a local time of the user device to the time data of the user digital signature. In embodiments, the method includes generating one or more control signals configured to cause the presenting device to display the video file. In embodiments, the method includes generating one or more control signals configured to cause the one or more attendee devices to generate audio corresponding to the audio file simultaneously with the video file on the presenting device.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
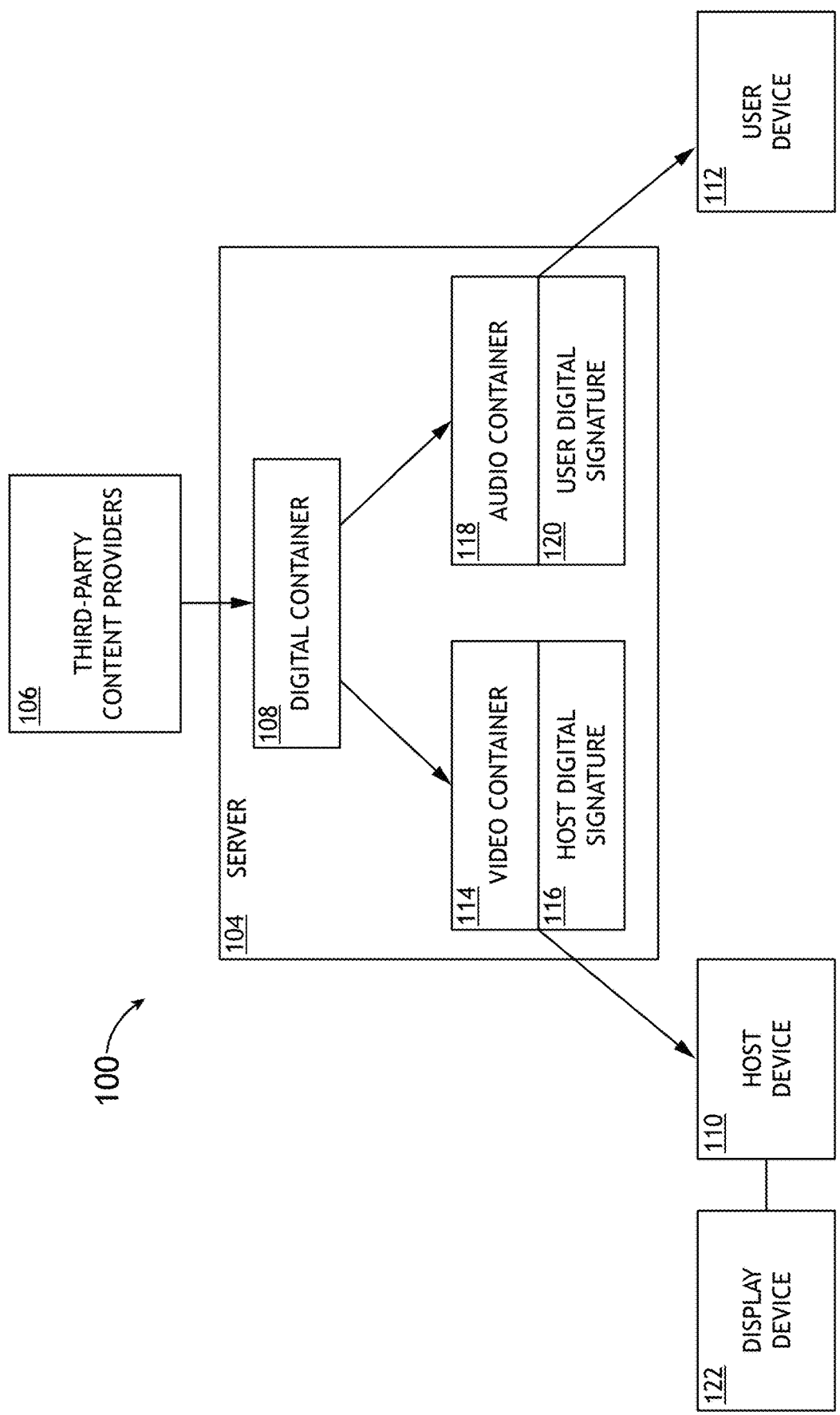
FIG. 1 illustrates a block diagram of a system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Embodiments of the present disclosure relate to a system and method for enabling and facilitating the delivery of audio-visual content to a group of people. The system may use an application-based system to provide a video file to a host device, while separately providing audio files to a group of user devices in near real-time. The host device may display the video file to the group, while each user device in the group simultaneously plays the accompanying audio file. This results in a group watching experience.

It is contemplated herein that each user device playing the accompanying audio file can create a more personal movie watching experience. Audio in different languages may be provided to different users, allowing one video file to support a multitude of different languages. Additionally, it is contemplated herein that closed captioning may be provided at user request, thus allowing further personalization to the user's movie experience. The system and method of the present disclosure may also be implemented in wide variety of locations, such as parks, restaurants, and churches with little infrastructure needed.

Reference will now be made in detail to the subject matter disclosed, which is illustrated in the accompanying drawings.

FIG. 1 illustrates a block diagram of a system 100 for enabling and facilitating the delivery of audio-visual content to a group of people, in accordance with one or more embodiments of the present disclosure.

In embodiments, the system 100 may include a server 104 including one or more processors and memory.

In embodiments, the system 100 may include one or more third-party content providers 106. The one or more third-party content providers 106 may be communicatively coupled, or integrated with, the server 104. For example, the one or more third-party content providers 106 may be communicatively coupled with the server 104 via one or more third-party application program interfaces (APIs).

It is contemplated herein that the one or more third-party content providers 106 may include suitable content provider. For example, the one or more third-party content providers 106 may include an owner of a digital copy of an audio-visual work who have a legal right to distribute the audio-visual work (e.g., copyright owner, licensee, or the like).

Further, it is contemplated herein that the audio-visual work may be any video capable of being displayed such as, but not limited to, a film, a sports game, a television show, or the like. For example, the audio-visual work may include a movie studio with the audio-visual work being a film that the movie studio has the legal rights to show.

In embodiments, a digital copy of the audio-visual work may be saved into a digital container 108 by the one or more third-party content providers 106, in order to be transferred. The digital container 108 may be formatted into any digital video file format such as, for example, Audio Video Interleave (AVI), Quicktime, WebM, Windows Media Video, or the like.

In embodiments, the digital container 108 may include at least a video container 114 and an audio container 118. In embodiments, the video container 114 contains visual data, e.g., video without audio, of the digital container 108 in a video coding format (e.g., H.120, H.264, MEP-1 Part 1, MEG-4 Part 2). The corresponding audio data of the visual data is stored in the audio container 118 in an audio coding format (e.g., Opus, MP3, Dolby Digital, AAC). The digital container 108 may also contain metadata. In embodiments, the digital container 108 may also include closed captioning data and/or alternative language audio data.

In embodiments, the one or more third-party content providers 106 may upload the digital container 108 to the server 104 operated by the administrator of the system 100. For example, the server 104 may be an application-based system, such as a phone app. For instance, the one or more third-party content providers 106 may upload the digital container 108 to the server 104 via the phone app. In this regard, the server 104 may receive the digital container 108 from the phone app via a third-party API. Alternatively, the administer may access the content owner's media database using an Application Programming Interface "API".

After the digital container 108 is received by the server 104 of the administrator, the digital container 108 may be further processed to split the digital container 108 into two independent files for the video container 114 and audio container 118. For example, the server 104 may utilize any suitable technique to split the digital container 108 into the video container 114 and audio container 118 such as, but not limited to, one or more software platforms (e.g., QuickTime, VLC, Adobe, or the like), or the like. The video container 114 and audio container 118 may be separately downloaded onto a variety of devices. For example, the video container 114 may be downloaded onto a device, such as but not limited to a laptop, a desktop, a smartphone, a smart tablet, or the like, without the audio container 118. By way of another example, the audio container 118 may be downloaded onto a device, such as but not limited to a laptop, a desktop, a smartphone, a smart tablet, or the like, without the video container 114. In this regard, the video container 114 may contain a video file, while the audio container 118 may contain an audio file.

The server 104 of the administrator may be communicatively coupled, or integrated with, one or more user devices 112 and a host device 110. For example, the server 104 may generate one or more control signals configured to cause at least one of the host device 110 or one or more user devices 112 to perform certain tasks. In one instance, the one or more control signals may be configured to cause at least one of the host device 110 or the one or more user devices 112 to display a video corresponding to the video container 114. In another instance, the one or more control signals may be configured to cause at least one of the host device 110 or the one or more user devices 112 to generate, or play, audio corresponding to the audio file.

In embodiments, a user of the host device 110 may register themselves as an event organizer (herein referred to as a host 202) to the server 104. Registration may include selecting a participant type from a list of categories (e.g., a host 202, a user 204, a third-party content provider 106, or the like). Registration may also include providing information about the host 202. For example, during registration, the host 202 may provide information such as the equipment types available to the host 202, for instance display devices 122. The host 202 may request to display the audio-visual work that has been uploaded to the server 104 by the one or more third-party content providers 106 at a particular time and location herein referred to as an event 200. The host device 110 may include any device capable of displaying or casting video content including, but not limited to, smartphones, smart watches, tablets, computers, smart TVs, wearable devices, and the like.

In embodiments, a host 202 may choose the location of the event 200 and the time of the event 200. For example, the host 202 may select any time and date that the host 202 will display the requested audio-visual work, or the time of the event 200 and provide the chosen location/time of the event to the server 104. Additionally, the host 202 may select a location where the host 202 will display the requested audio-visual work, or the location of the event 200. In embodiments, the host 202 may chose the location of the event 200 from a list of location options (e.g., theaters, parks, restaurants, churches, or the like).

Once an audio-visual work has been requested and a time and location of the event 200 has been chosen, the host device 110 may request to download the video container 114 associated with the requested audio-visual work. The server 104 may be configured to identify whether the host device 110 is authorized to download video container 114. For example, the server 104 may be configured to determine whether the device in question has been registered as a host device 110. By way of another example, the server 104 may be configured to determine whether the device in question has chosen the parameters (e.g., time and location) to organize the event 200. The identified (or authorized) host device 110 may then be configured to download or receive, the video container 114.

In embodiments, the location of the event may be embedded into host specific data accompanying the video container 114, herein referred to as a host digital signature 116. For example, the location of the event may be embedded into the host digital signature 116 as location data, such that the location data may be downloaded with the video container 114. The location data may include a geographic area associated with the event 200. For example, the geographic area may be pre-defined by the host 202.

The location data may prevent the video container 114 from being played or displayed when the geographic location of the host device 110 does not match the location indicated by the location data. For example, the server 104 may be configured to compare the location data of the host digital signature 116 and the geographic location of the host device 110.

It is contemplated herein that the geographic location of the host device 110 may be determined using location circuitry of the host device 110. For example, the geographic location of the host device 110 may be determined using one or more GPS signals associated with the location of the host device 110. For instance, the location of the host device 110 may be determined based on gyroscopic data associated with the host device 110. Additionally, the time of the event may be embedded into the host digital signature 116. For example, the time of the event 200 may be embedded into the host digital signature 116 as time data, such that the time data may be downloaded with the video container 114. The time data may include a time and date associated with the event 200. For example, the time may be pre-defined by the host 202.

The time data may prevent the video container 114 from being played or displayed when the local time of the host device 110 does not match the time and date indicated by the time data. For example, the server 104 may be configured to compare the time data of the host digital signature 116 and the local time of the host device 110.

It is contemplated herein that the local time of the host device 110 may be determined using location circuitry of the host device 110. For example, the local time of the host device 110 may be determined using the internal clock feature of the host device 110.

In embodiments, host identification data (herein referred to as a host ID) may be embedded into the host digital signature 116.

In embodiments, the one or more users 204 may register their one or more user devices 112 as registered user devices to the server 104. Registration may include selecting a participant type from a list of categories (e.g., a host 202, a user 204, a third-party content provider 106) and providing information, such as user 204 name or age. After a host 202 has organized an event 200 on the server 104, users 204 may indicate that they plan to attend the event 200. For example, the users 204 may purchase a ticket to the event through the server 104 to indicate that they plan the attend the event. By way of another example, the users 204 may receive a ticket from another.

The one or more user devices 112 may then request to download the audio container 118 from the server 104. For example, the server 104 may be configured to identify whether the user device 112 is authorized to download audio container 118. For instance, the server 104 may be configured to determine whether the device in question has been registered as a user device 112 to the server 104, and has indicated that they are authorized to attend the event. The identified (or authorized) user device 112 is then configured to download, or receive, the audio container 118.

In embodiments, the location of the event 200 may be embedded into user specific data accompanying the audio container 118, herein referred to as a user digital signature 120. For example, the location of the event 200 may be embedded into the user digital signature 120 as location data, such that the location data may be downloaded with the audio container 118. The location data may include a geographic area associated with the event 200. For example, the geographic area may be pre-defined by the host 202.

The location data may prevent the audio container 118 from being played when the geographic location of the user device 112 does not match the location indicated by the location data. For example, the server 104 may be configured to compare the location data of the user digital signature 120 and the geographic location of the user device 112.

It is contemplated herein that the geographic location of the user device 112 may be determined using location circuitry of the user device 112. For example, the geographic location of the user device 112 may be determined using one or more GPS signals associated with the location of the user device 112. For instance, the location of the user device 112 may be determined based on gyroscopic data associated with the user device 112. Additionally, the time of the event may be embedded into the user digital signature 120. For example, the time of the event 200 may be embedded into the user digital signature 120 as time data, such that the time data may be downloaded with the audio container 118. The time data may include a time and date associated with the event 200. For example, the time may be pre-defined by the host 202.

The time data may prevent the audio container 118 from being played when the local time of the user device 112 does not match the time and date indicated by the time data. For example, the server 104 may be configured to compare the time data of the user digital signature 120 and the local time of the user device 112.

It is contemplated herein that the local time of the user device 112 may be determined using location circuitry of the user device 112. For example, the local time of the user device 112 may be determined using the internal clock feature of the user device 112.

In embodiments, user identification data (herein referred to as a user ID) may be embedded into the host digital signature 116.

Figure 2:
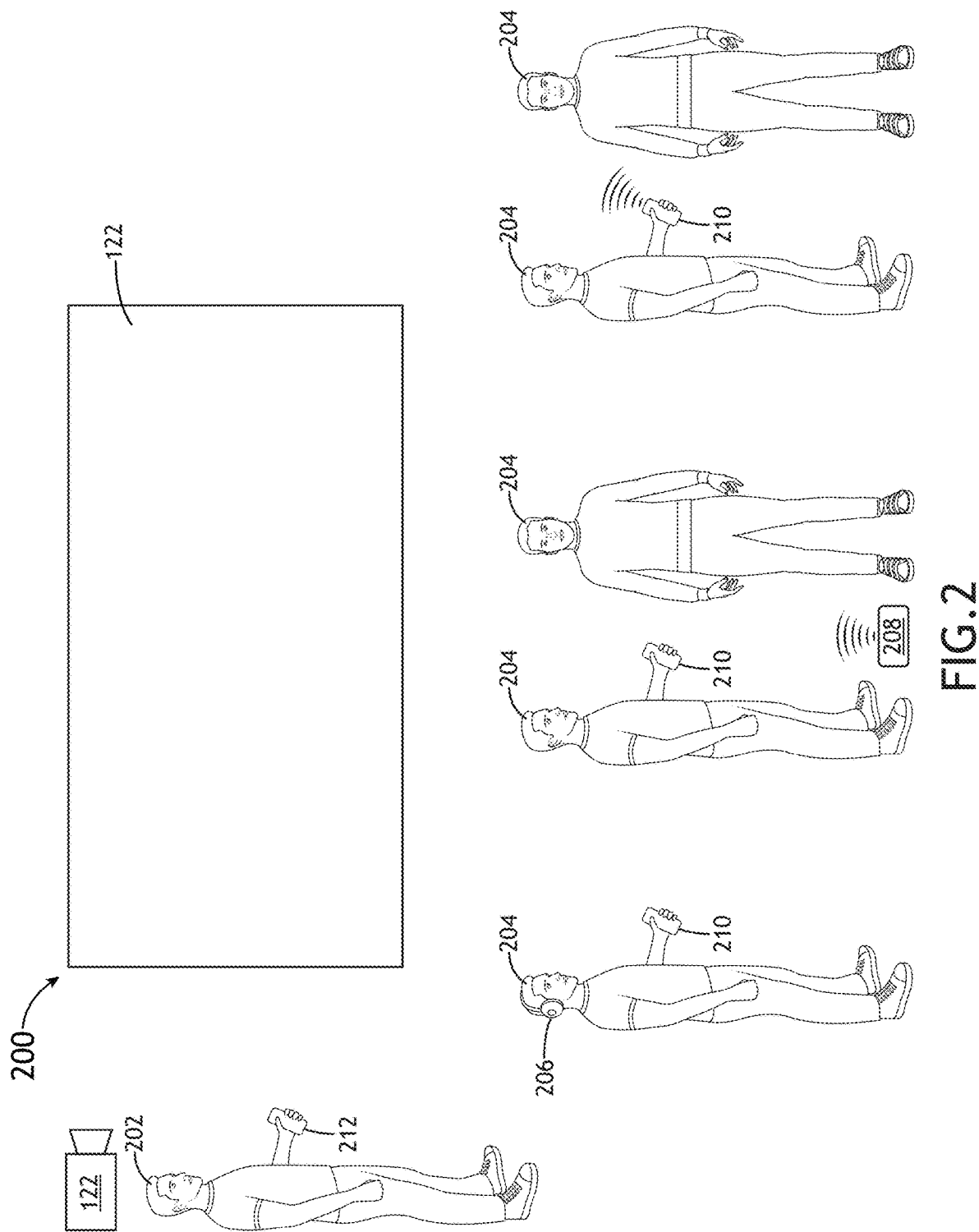
FIG. 2 illustrates a diagram depicting an event, in accordance with one or more embodiments of the present disclosure.

FIG. 2 illustrates a diagram depicting an event 200, in accordance with one or more embodiments of the present disclosure.

In embodiments, the event 200 includes the host 202 associated with the host device 110. At the time of the event, the host 202 may have already completed one or more steps, as previously discussed herein. For example, the host 202 may have already completed registration of the host device 110. For instance, the host 202 may have selected a participant type from a list of categories (e.g., a host 202, a user 204, a third-party content provider 106) and provided information about the host 202. By way of another example, the host 202 may have already completed the registration of the event 200. By way of another example, the server 104 may have identified the host device 110 as an authorized host device and the host device 110 may have already downloaded the video container 114. For instance, the server 104 may have determined whether the device in question has have chosen the parameters (e.g., time and location) to organize the event 200. By way of another example, the host device 110 may have already downloaded the video container 114 and the accompanying host digital signature 116 of the audio-visual work associated with the event 200.

The event 200 may also include the one or more users 204 associated with the one or more user devices 112. At the time of the event, the one or more users 204 may have already completed one or more steps, as previously discussed herein. For example, the user 204 may have already completed registration of the user device 112. For instance, the user 204 may have selected a participant type from a list of categories (e.g., a host 202, a user 204, a third-party content provider 106) and provided information about the user 204. By way of another example, the server 104 may have identified the one or more user devices 112 as an authorized user device 112 and the one or more user devices 112 may have already downloaded the audio container 118. For instance, the server 104 may have determined whether the device in question had indicated that the user 204 would be attending the event. By way of another example, the user device 112 may have already downloaded the audio container 118 and the accompanying user digital signature 120 of the audio-visual work associated with the event 200.

In embodiments, the host device 110 may be communicatively coupled to a display device 122. The display device 122 may include any equipment used to display the video file to a group of the one or more users 204, such as, but not limited to, a projector and screen, a large format television screen, or the like. The host device 110 may be communicatively coupled to the display device 122 via a wireline (e.g., HDMI cable, fiber optic cable, and the like) or wireless connection (e.g., Wifi, Bluetooth connection and the like). For example, the host device 110 may be communicatively coupled to a projector via Bluetooth. The projector may display the video file onto a large format screen, which may be observed by the one or more users 204 simultaneously.

The host device 110 may display a variety of third-party content in addition to the video file on the display device 122, such as advertisements, pre-show activities, location specific safety information (e.g., the location of fire exits), behind the scenes footage, bloopers, and the like. The variety of third-party content may have been uploaded by one or more third-party content providers 106 to the server 104 and then downloaded from the server 104 to the host device 110. Alternatively, the variety of third-party content may have been uploaded from the one or more user devices 112 to the server 104 and then downloaded from the server 104 to the host device 110. In embodiments, the variety of third-party content may be displayed on the display device 122 at a time before the local time associated with the time data of the host digital signature 116. Alternatively, the variety of third-party content may be displayed on the display device 122 at a time after the display of the video file. Additionally, the variety of third-party content may be displayed on the display device 122 at a time during the display of the video file. For example, the host device 110 may display advertisements and pre-show activities before the local time associated with the time data of the host digital signature 116, display advertisements during the display of the video file, and then display bloopers and behind the scenes footage after the display of the video file has concluded.

At the time of the event, the server 104 may be configured to determine whether the host device 110 is a presenting device 212. For example, the server 104 may be configured to compare a location of the host device 110 and a pre-defined geographic location of the event 200, where a host device 110 that is located at the geographic location of the event during the time and date of the event may be considered a presenting device 212. For instance, the server 104 may determine whether a host device 110 is a presenting device 212 by comparing a local time of the host device 110 to the time data of the host digital signature 116 and comparing a geographic location of the host device 110 to the location data of the host digital signature 116. In this regard, when the local time of the host device 110 and the time data of the host digital signature 116 match and the geographic location of the host device 110 and the location data match, then the server 104 may determine that the host device 110 is a presenting device 212.

It is contemplated herein that a presenting device 212 may be a host device 110 at the time of the event 200 and located at the geographic location of the event 200. For this reason, host device 110 may be referenced to describe a presenting device 212. Likewise, a presenting device 212 may be referenced to describe a host device 110 at the time of the event 200 and located at the geographic location of the event 200.

Additionally, at the time of the event 200, the server 104 may be configured to determine whether the one or more user devices 112 are attendee devices 210. For example, the server 104 may be configured to compare a location of the user device 112 and a pre-defined geographic location of the event, where a user device 112 that is located at the geographic location of the event during the time and date of the event may be considered an attendee device. For instance, the server 104 may determine whether a user device 112 is an attendee device 210 by comparing a local time of the user device 112 to the time data of the user digital signature 120 and comparing a geographic location of the user device 112 to the location data of the user digital signature 120. In this regard, when the local time of the user device 112 and the time data of the user digital signature 120 match and the geographic location of the user device 112 and the location data match, then the server 104 may determine that the user device 112 is an attendee device 210.

It is contemplated herein that an attendee device 210 may be a user device 112 at the time of the event 200 and located at the geographic location of the event 200. For this reason, user device 112 may be referenced to describe an attendee device 210. Likewise, an attendee device may be referenced to describe a user device 112 at the time of the event 200 and located at the geographic location of the event 200.

The server 104 may be configured to generate one or more control signals configured to cause the presenting device 212 to display the video file. For example, the one or more control signals may be configured to cause the presenting device 212 to automatically begin displaying the video file. By way of another example, the one or more control signals may be configured to cause the presenting device 212 to display the video file based on one or more inputs from the host 202 (e.g., pressing a play button to begin the display, or the like).

Additionally, the server 104 may be configured to generate one or more control signals configured to cause the one or more attendee devices 210 to generate audio associated with the audio file. For example, the one or more control signals may be configured to cause the one or more attendee devices 210 to automatically generate audio associated with the audio file. In embodiments, the one or more control signals may be configured to cause the one or more attendee devices 210 to generate the audio simultaneously with the displayed video associated with the presenting device 212. By way of another example, the one or more control signals may be configured to cause the attendee device 210 to generate audio associated with the audio file based on one or more inputs from the host 202 (e.g., pressing a play button to begin the display, or the like).

The audio corresponding to the audio file may be generated through attendee device 210 machinery. For example, the audio corresponding to the audio file may be played through the attendee device's internal speaker. By way of another example, the audio corresponding to the audio file may be played through the use of an external sound device communicatively coupled to the one or more attendee devices 210. The external sound device may include, but is not limited to, a portable speaker 208, headphones 206, or the like. It is contemplated herein that headphones 206 may provide audio to a single user 204 by generating the audio through the headphone 206 earpieces. Alternatively, audio may be provided to a group of users 204 through a portable speaker 208.

In embodiments, after the conclusion of the display of video file, the server 104 may be configured to generate one or more control signals configured to remove, or erase, the video container 114 from the presenting device 212. For example, when the video file has been played and displayed in its entirety, the server 104 may generate one or more control signals configured to remove the video container 114 from the presenting device 212 automatically. By way of another example, when the video file has been played and displayed in its entirety, the server 104 may generate one or more control signals configured to remove the video container 114 from the presenting device 212 based on one or more inputs from the host 202 (e.g., pressing an event concluded button to remove the video file, or the like).

In embodiments, after the conclusion of the display of the video file, the server 104 may be configured to generate one or more control signals configured to remove, or delete, the audio container 118 from the one or more attendee devices 210. For example, when the video file and corresponding audio file has been played in its entirety, the server 104 may generate one or more control signals configured to automatically remove the audio container 118 from the one or more attendee devices 210. By way of another example, when the video file and corresponding audio file have been played in its entirety, the server 104 may generate one or more control signals configured to remove the audio container 118 from the attendee device 210 based on one or more inputs from the host 202 (e.g., pressing an event concluded button to remove the video file, or the like).

Figure 3:
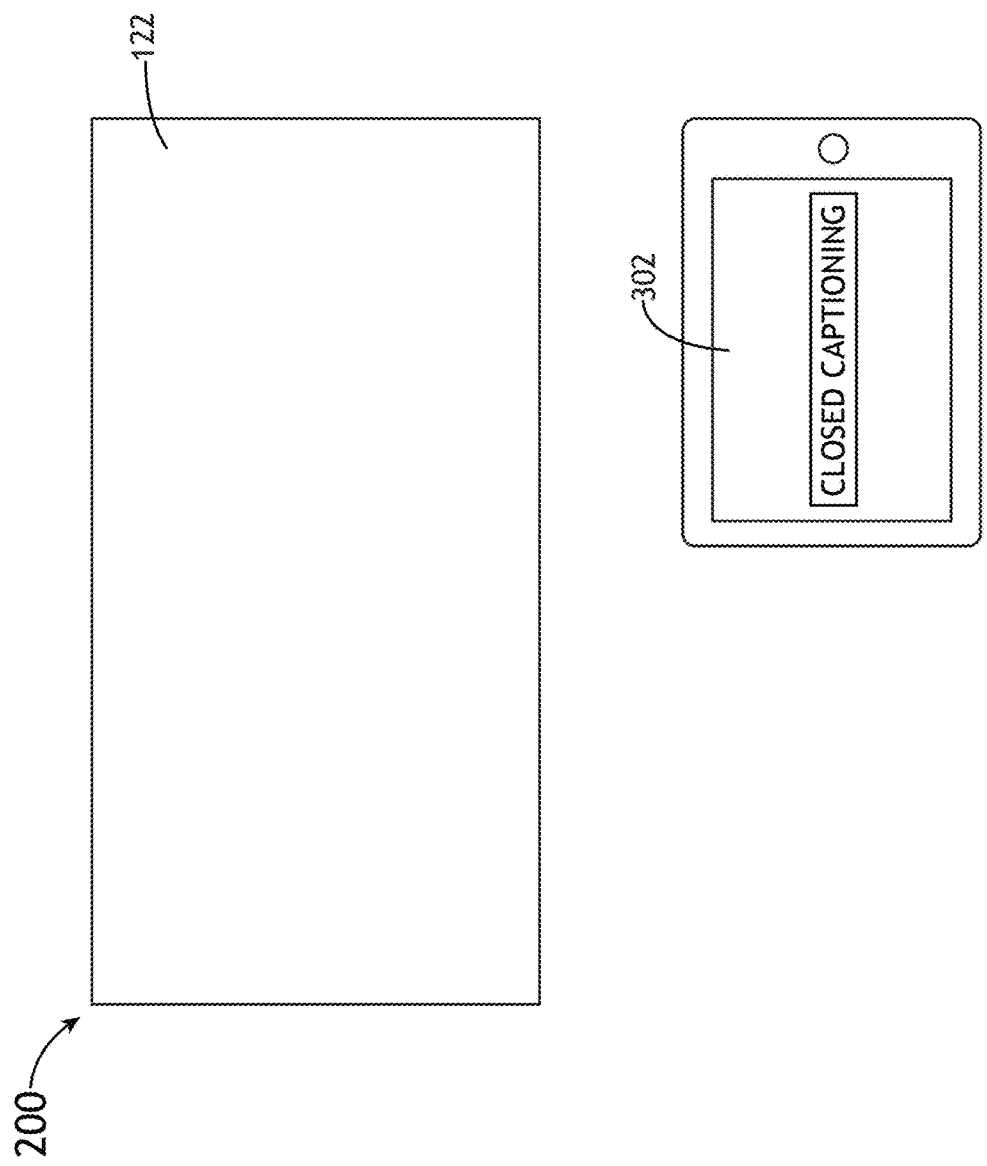
FIG. 3 illustrates a diagram depicting an event integrating closed captioning, in accordance with one or more embodiments of the present disclosure.

FIG. 3 illustrates a diagram depicting an event integrating closed captioning, in accordance with one or more embodiments of the present disclosure.

In embodiments, the digital container 108 from the one or more third-party content providers 106 may include closed captioning data 302. For example, the closed captioning data 302 may include the written text of the associated audio file, as to allow hard of hearing users 204 to read the audio. The audio container 118 received by the server 104 may include the closed captioning data 302. In some instances, the closed captioning data 302 and the audio container 118 may be provided independently to the server 104.

In embodiments, the one or more users 204 may request the closed captioning data 302 when requesting to download the audio container 118. For example, the server 104 may provide the closed captioning data 302 with the audio container 118.

The server 104 may be configured to generate one or more control signals configured to cause the one or more attendee devices 210 to display the closed captioning data 302 associated with the audio file on a screen associated with the attendee device. For example, the one or more control signals may be configured to cause the one or more attendee devices 210 to automatically to display the closed captioning data 302 associated with the audio file. In embodiments, the one or more control signals may be configured to cause the one or more attendee devices 210 to display the closed captioning data 302 associated with the audio file simultaneously with the displayed video associated with the presenting device 212. By way of another example, the one or more control signals may be configured to cause the attendee device 210 to display the closed captioning data 302 associated with the audio file based on one or more inputs from the host 202 (e.g., pressing a play button to begin the display, or the like).

In embodiments, the digital container 108 may include alternative language audio files. For example, alternative language audio files may include audio files which provide the audio of the associated video file in a language other than the original language of the audio-visual work. For instance, in a non-limiting example, if the original language of the audio-visual work is English, an alternative language audio file may include an audio file which provides the audio of the audio-visual work in any non-English language (e.g., French, Spanish, Chinese, or the like).

In embodiments, the one or more users 204 may request an alternative language audio file when requesting to download the audio container 118. For example, the server 104 may provide the alternative language audio file with the audio container 118.

It is contemplated herein that the alternative language audio files may be provided independently to the server 104 as well.

At the time of the event, the server 104 may be configured to generate one or more control signals configured to cause the one or more attendee devices 210 to generate audio. For example, the one or more control signals may be configured to cause the one or more attendee devices 210 to generate the audio associated with the alternative language file simultaneously with the display of the associated video file.

In embodiments, the digital container 108 may include may include alternative language closed captioning data. For example, alternative language closed captioning data may include the written text of the associated audio file in a language other than the original language of the audio-visual work. For instance, in a non-limiting example, if the original language of the audio-visual work is English, an alternative language audio file may include an audio file which provides the closed captioning data of the audio-visual work in any non-English language (e.g., French, Spanish, Chinese, or the like).

The server 104 may be configured to generate one or more control signals configured to cause the one or more attendee devices 210 to display the alternative language closed captioning data associated with the audio file on a screen associated with the attendee device. For example, the one or more control signals may be configured to cause the one or more attendee devices 210 to automatically to display the alternative language closed captioning data associated with the audio file. In embodiments, the one or more control signals may be configured to cause the one or more attendee devices 210 to display the alternative language closed captioning data associated with the audio file simultaneously with the displayed video associated with the presenting device 212. By way of another example, the one or more control signals may be configured to cause the attendee device 210 to display the closed captioning data 302 associated with the audio file based on one or more inputs from the host 202 (e.g., pressing a play button to begin the display, or the like).

It is contemplated herein that the alternative language closed captioning may be provided independently to the server 104 as well.

Figure 4:
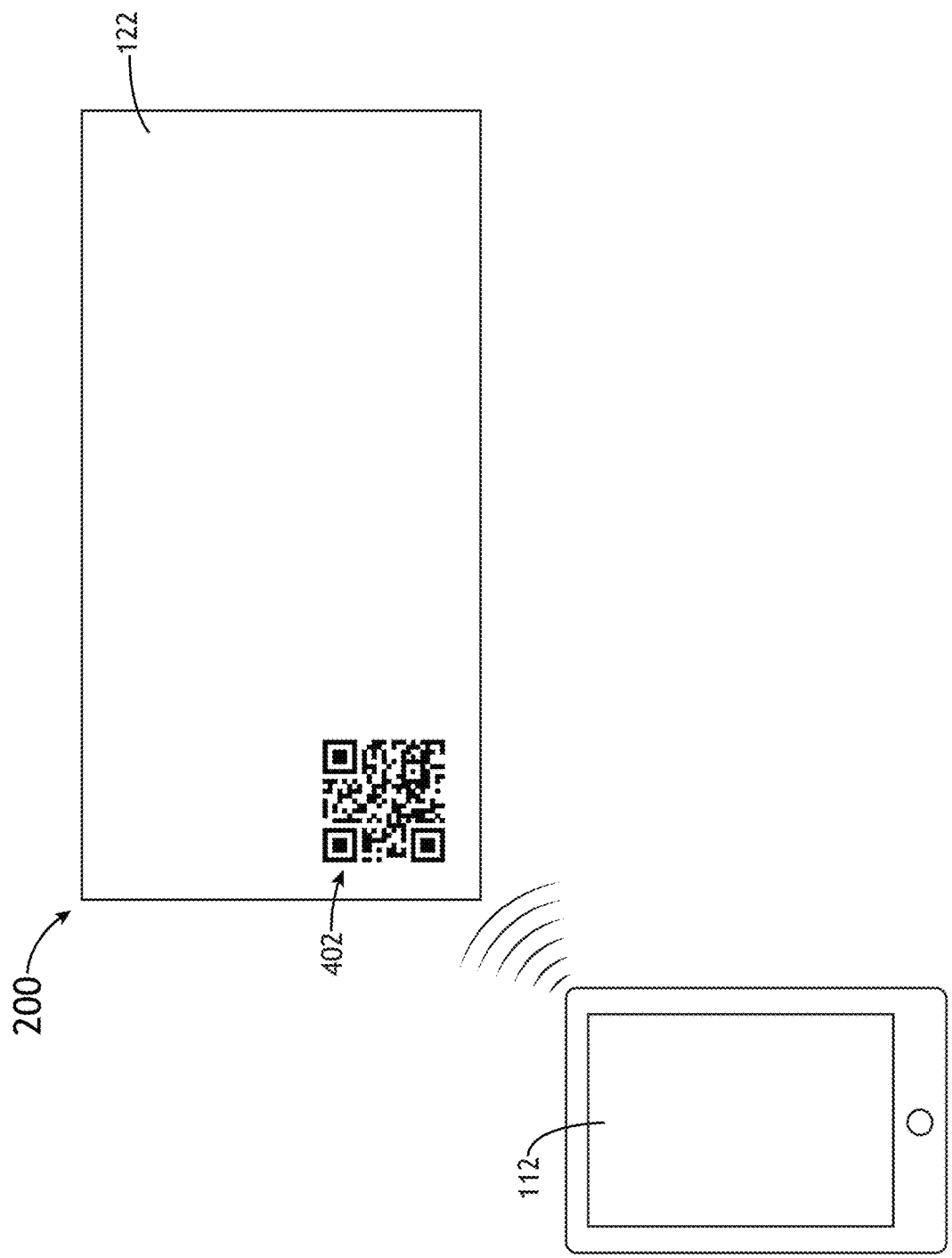
FIG. 4 illustrates a diagram depicting an event utilizing an identification tag, in accordance with one or more embodiments of the present disclosure.

FIG. 4 illustrates a diagram depicting an event 200 utilizing an identification tag 402, in accordance with one or more embodiments of the present disclosure.

In embodiments, the host 202 may display an identification tag 402. The identification tag 402 may be a machine-readable code. The host 202 may display the identification tag 402 through the host device 110. For example, the host 202 may display the identification tag 402 on a display device 122 via the host device 110. In way of another example, the host 202 may display the identification tag 402 through a physical medium such as a piece of paper.

In embodiments, the identification tag 402 may be associated with the location of the event 200. The one or more user devices 112 may read and decipher the identification tag 402. For example, the one or more user devices 112 may scan the identification tag 402 using the internal camera features of the one or more user devices 112. In this instance, scanning the identification tag may provide the server 104 with the geographic location of the one or more user devices 112. Further, scanning the identification tag may cause the user device 112 to display one or more additional items on the display of the user device 112 (e.g., a message, instructions, a website, or the like).

Figure 5:
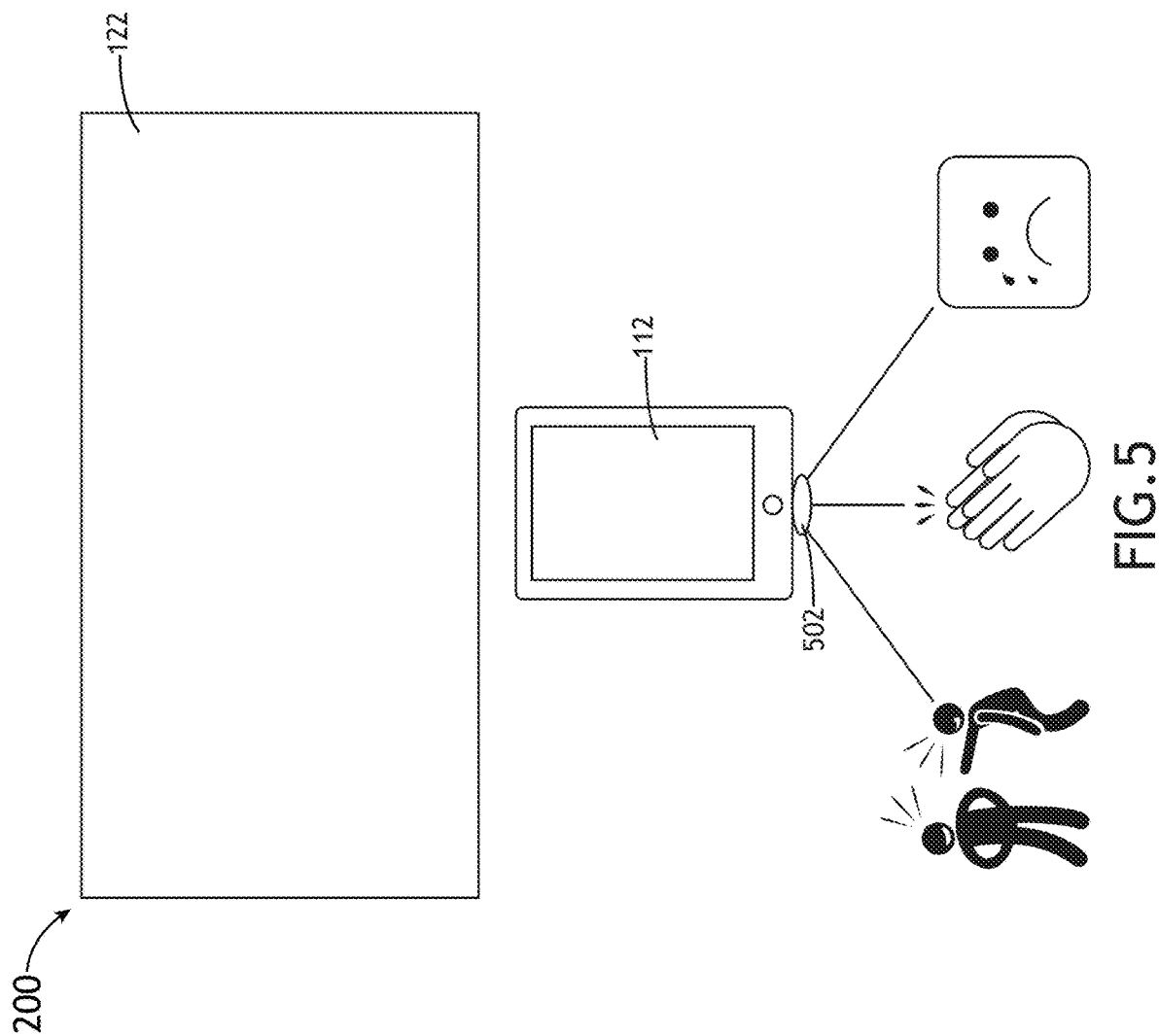
FIG. 5 illustrates a diagram depicting an event where the one or more user devices are collecting user data, in accordance with one or more embodiments of the present disclosure.

FIG. 5 illustrates a diagram depicting an event 200 where the one or more user devices 112 are collecting user data, in accordance with one or more embodiments of the present disclosure.

In embodiments, the one or more user devices 112 may collect user data. For example, user data may include, but is not limited to, microphone recordings, movement data, device usage data, exposure of the device to light, or the like.

In embodiments, the user data may be collected any time the one or more users 204 are engaged with the server 104. For example, the user data may be collected via the one or more user devices 112 when the audio associated with the audio file is being played during the event 200.

In embodiments, the server 104 may receive the user data from the user device 112 continually as it is collected. For example, the one or more user devices 112 may continuously collect the user data. In some instances, the server 104 may receive the user data from the user device 112 periodically. For example, the server 104 may receive the user data at one or more predetermined times. For instance, in a non-limiting example, the server 104 may receive the user data at the conclusion of the audio generation of the audio container 118.

In embodiments, the user data collected includes microphone recordings. For example, the microphone recordings may be obtained or recorded using an integrated microphone 502 of the user device 112. For instance, the user device 112 may be configured to begin a microphone recording when the integrated microphone 502 detects audience noise. The audience noise may include the audiences' reactions to the audio-visual work such as, but not limited to, laughing, clapping, crying, yelling, gasping, cheering, or the like. For example, the integrated microphone 502 may be configured to detect the noise of an audience reaction and record the noise into a microphone recording. The microphone recording may be timestamped (e.g., saved to include time data) with the time that the microphone recording was recorded. The timestamp may be associated with a particular moment of the audio-visual work when the sound was recorded. The user device 112 may temporarily store the microphone recording, before providing or uploading the microphone recording to the server 104. The server 104 may be configured to receive and store the microphone recording.

The microphone recording may be further analyzed to determine certain analytics about the audio-visual work. For example, the server 104 may be configured to analyze laughter captured on a series of microphone recordings. In this regard, captured laughter may indicate that the particular moment of the audio-visual work was perceived by users 204 to be humorous.

In embodiments, the microphone recordings may measure an ambient sound measurement of the location of the event 200. For example, the microphone recordings may record the background noise present at the location of the event 200 while the user 204 is not making any sounds. In this regard, the ambient sound measurement may be analyzed to determine how noisy a location is. The microphone recordings may also record a measure of the audio being generated by the speaker of the user device 112, or an associated external sound device as the audio file is played. In this regard, the measure of the audio generated is associated with a specific user 204.

The server 104 may be configured to receive the ambient sound measurement of the location of the event 200 and the measure of the audio generated associated with a user 204. In embodiments, the server 104 may calculate the difference in amplitude, or noise level, between the ambient sound measurement and the measure of the audio generated.

In embodiments, the user data collected includes movement data. For example, movement data may include one or more GPS signals associated with the location of the user device 112. By way of another example, movement data may include gyroscopic data associated with the movement of the user device 112.

In some instances, the movement data may be timestamped, such that the movement data is saved with time data reflecting a time at which the data was collected. For example, the one or more GPS signals associated with the location the user device 112 may be collected to observe, or track, the physical movement of a user device 112 at the event 200. The movement data may be provided and uploaded to the server 104, and further analyzed to determine certain analytics about the audio-visual work. For example, movement data which captured the one or more of user devices 112 moving at a particular moment of the audio-visual work may indicate that many users 204 chose that particular moment to move around.

Figure 6:
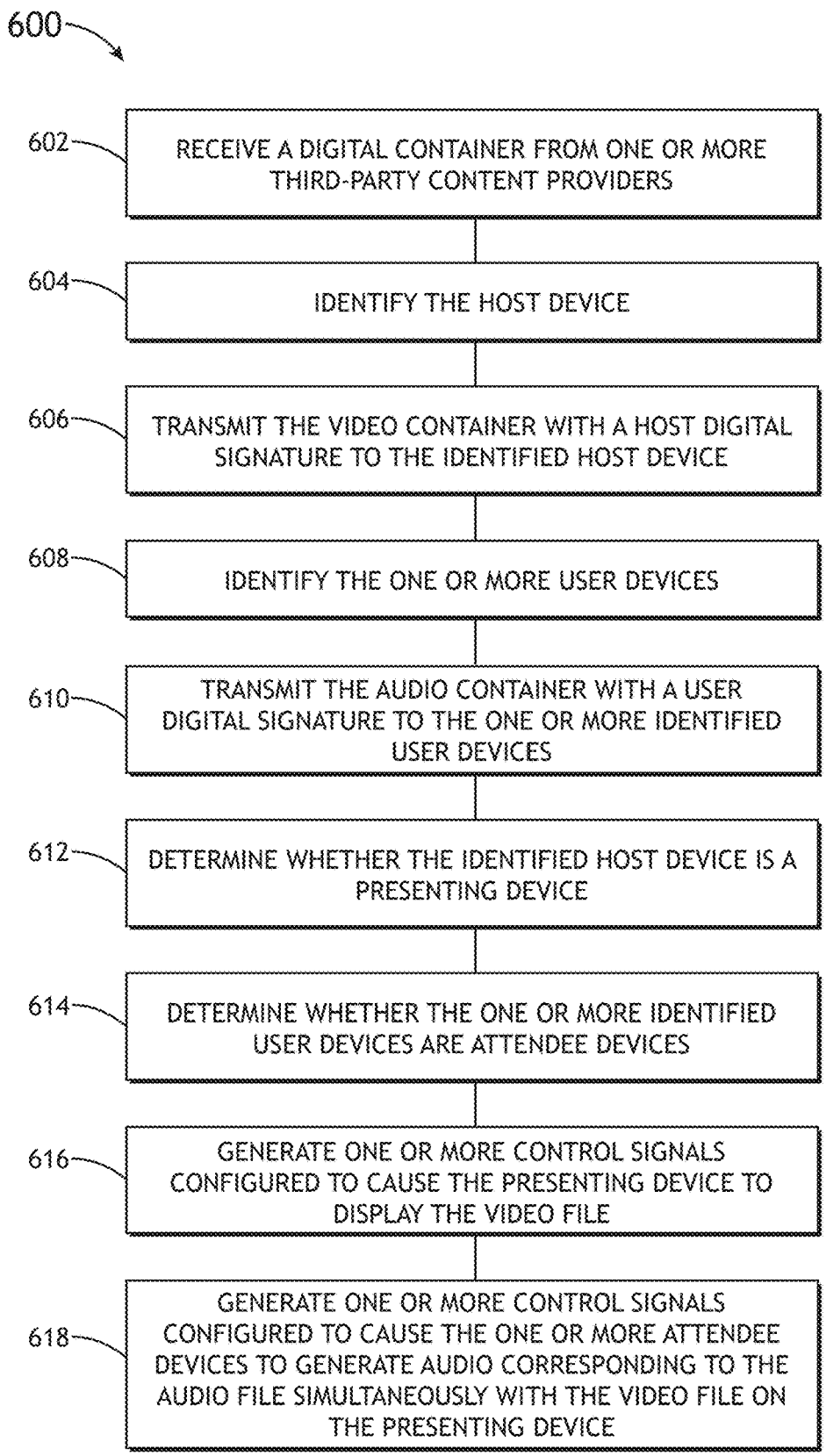
FIG. 6 illustrates a flow diagram depicting a method for facilitating an audio-visual work to a group of people, in accordance with one or more embodiments of the present disclosure.

FIG. 6 illustrates a flow diagram depicting a method 600 for facilitating an audio-visual work to a group of people via the server 104, in accordance with one or more embodiments of the present disclosure. It is noted herein that the steps of method 600 may be implemented all or in part by system 100. It is further recognized, however, that the method 600 is not limited to the system 100 in that additional or alternative system-level embodiments may carry out all or part of the steps of method 600.

In a step 602, the server 104 may receive a digital container 108 from one or more third-party content providers 106. For example, the digital container 108 may include an audio-visual work saved into a digital format, such as Audio Video Interleave (AVI), Quicktime, WebM, Windows Media Video or the like. The digital container 108 may include a video container 114, associated with a video file, and an audio container 118, associated with an audio file.

In a step 604, the server 104 may identify the host device 110. The server 104 may identify whether the host device 110 is authorized to download video container 114. For example, the server 104 may be configured to determine whether the device in question has been registered as a host device 110. By way of another example, the server 104 may be configured to determine whether the device in question has chosen the parameters (e.g., time and location) to organize the event 200.

In a step 606, the server 104 may transmit, or digitally send, the video container 114 with a host digital signature 116 to the identified host device 110.

In a step 608, the server 104 may identify the one or more user devices 112. For example, the server 104 may identify whether the user device 112 is authorized to download audio container 118. For instance, the server 104 may be configured to determine whether the device in question has been registered as a user device 112 to the server 104, and has indicated that they are authorized to attend the event.

In a step 610, the server 104 may transmit, or digitally send, the audio container 118 with a user digital signature 120 to the one or more identified user devices 112.

In a step 612, the server 104 may determine whether the host device 110 is a presenting device 212. For example, the server 104 may be configured to compare a location of the host device 110 and a pre-defined geographic location of the event 200, where a host device 110 that is located at the geographic location of the event 200 during the time and date of the event 200 may be considered a presenting device 212.

In a step 614, the server 104 may determine whether the one or more identified user devices 112 are attendee devices 210. For example, the server 104 may be configured to compare a location of the user device 112 and a pre-defined geographic location of the event, where a user device 112 that is located at the geographic location of the event 200 during the time and date of the event may be considered an attendee device 210.

In a step 616, the server 104 may generate one or more control signals configured to cause the presenting device 212 to display the video file. For example, the one or more control signals may be configured to cause the presenting device 212 to automatically begin displaying the video file. By way of another example, the one or more control signals may be configured to cause the presenting device 212 to display the video file based on one or more inputs from the host 202 (e.g., pressing a play button to begin the display, or the like).

In a step 618, the server 104 may generate one or more control signals configured to cause the one or more attendee devices 210 to generate audio corresponding to the audio file simultaneously with the video file on the presenting device 212. For example, the one or more control signals may be configured to cause the one or more attendee devices 210 to automatically generate audio associated with the audio file. In embodiments, the one or more control signals may be configured to cause the one or more attendee devices 210 to generate the audio simultaneously with the displayed video associated with the presenting device 212. By way of another example, the one or more control signals may be configured to cause the attendee device 210 to generate audio associated with the audio file based on one or more inputs from the host 202 (e.g., pressing a play button to begin the display, or the like).

Figure 7:
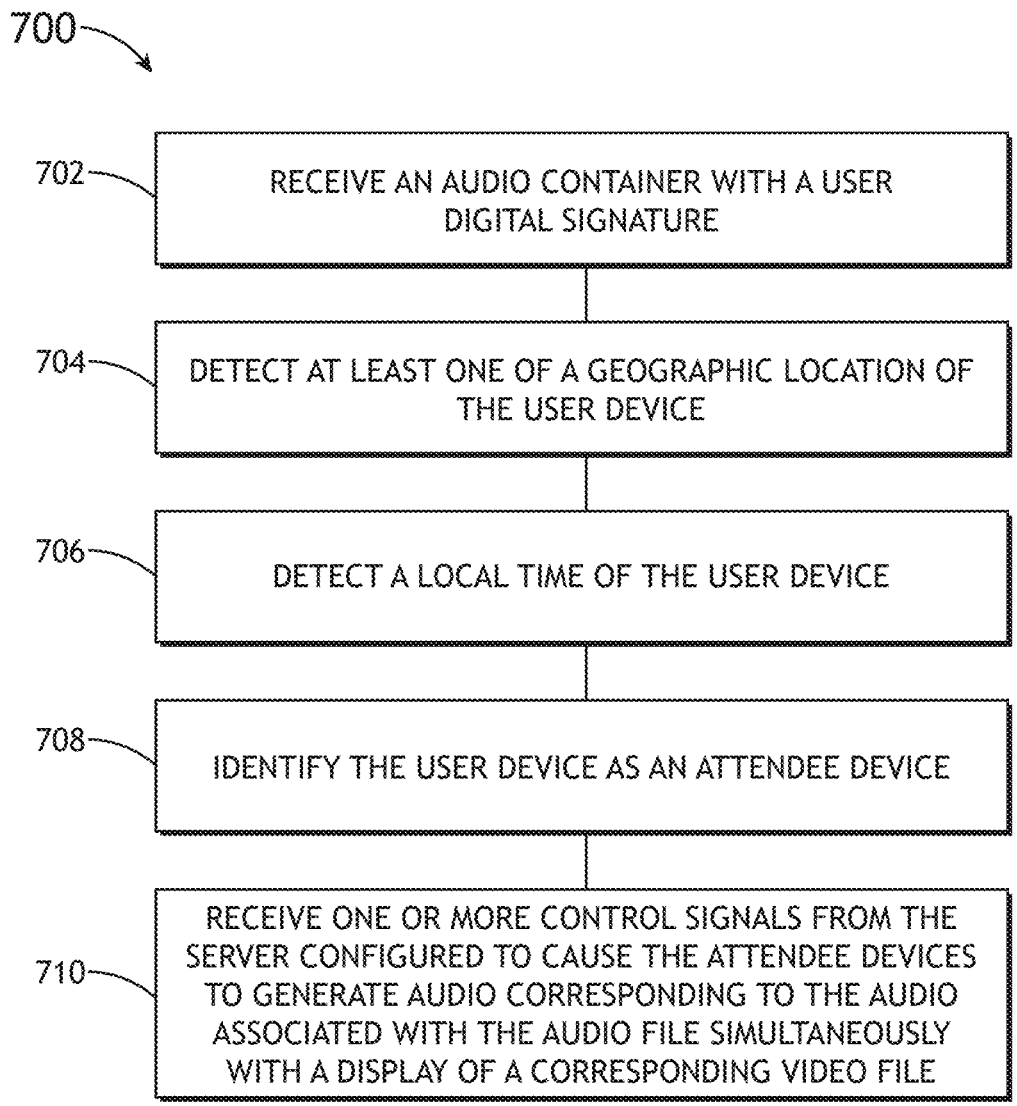
FIG. 7 illustrates a flow diagram depicting a method for generating audio corresponding to a video container of an audio-visual work via the user device, in accordance with one or more embodiments of the present disclosure.

FIG. 7 illustrates a flow diagram depicting a method 700 for generating audio corresponding to a video container of an audio-visual work via a user device 112, in accordance with one or more embodiments of the present disclosure. It is noted herein that the steps of method 700 may be implemented all or in part by system 100. It is further recognized, however, that the method 700 is not limited to the system 100 in that additional or alternative system-level embodiments may carry out all or part of the steps of method 700.

In a step 702, the user device 112 may receive an audio container 118 with a user digital signature 120. The audio container 118 may include an audio file. In embodiments the audio file may be associated with a video file. For example, the audio of an audio-visual work may be stored in the audio file, while the video of the audio-visual work may be stored in a corresponding video file.

In a step 704, the user device 112 may detect at least one of a geographic location of the user device 112. It is contemplated herein that the geographic location of the user device 112 may be determined using location circuitry of the user device 112. For example, the geographic location of the user device 112 may be determined using one or more GPS signals associated with the location of the user device 112. For instance, the location of the user device 112 may be determined based on gyroscopic data associated with the user device 112.

In a step 706, the user device 112 may detect a local time of the user device 112. It is contemplated herein that the local time of the user device 112 may be determined using location circuitry of the user device 112. For example, the local time of the user device 112 may be determined using the internal clock feature of the user device 112.

In a step 708, the user device 112 may be identified as an attendee device 210. For example, the server 104 may be configured to compare a location of the user device 112 and a pre-defined geographic location of the event, where a user device 112 that is located at the geographic location of the event during the time and date of the event may be considered an attendee device 210.

In a step 710 the user device 112 may receive one or more control signals from the server 104 configured to cause the attendee devices 210 to generate audio corresponding to the audio associated with the audio file simultaneously with a display of a corresponding video file. For example, the one or more control signals may be configured to cause the one or more attendee devices 210 to automatically generate audio associated with the audio file. In embodiments, the one or more control signals may be configured to cause the one or more attendee devices 210 to generate the audio simultaneously with displayed video associated with the corresponding video file. By way of another example, the one or more control signals may be configured to cause the attendee device 210 to generate audio associated with the audio file based on one or more inputs from the host 202 (e.g., pressing a play button to begin the display, or the like).

Figure 8:
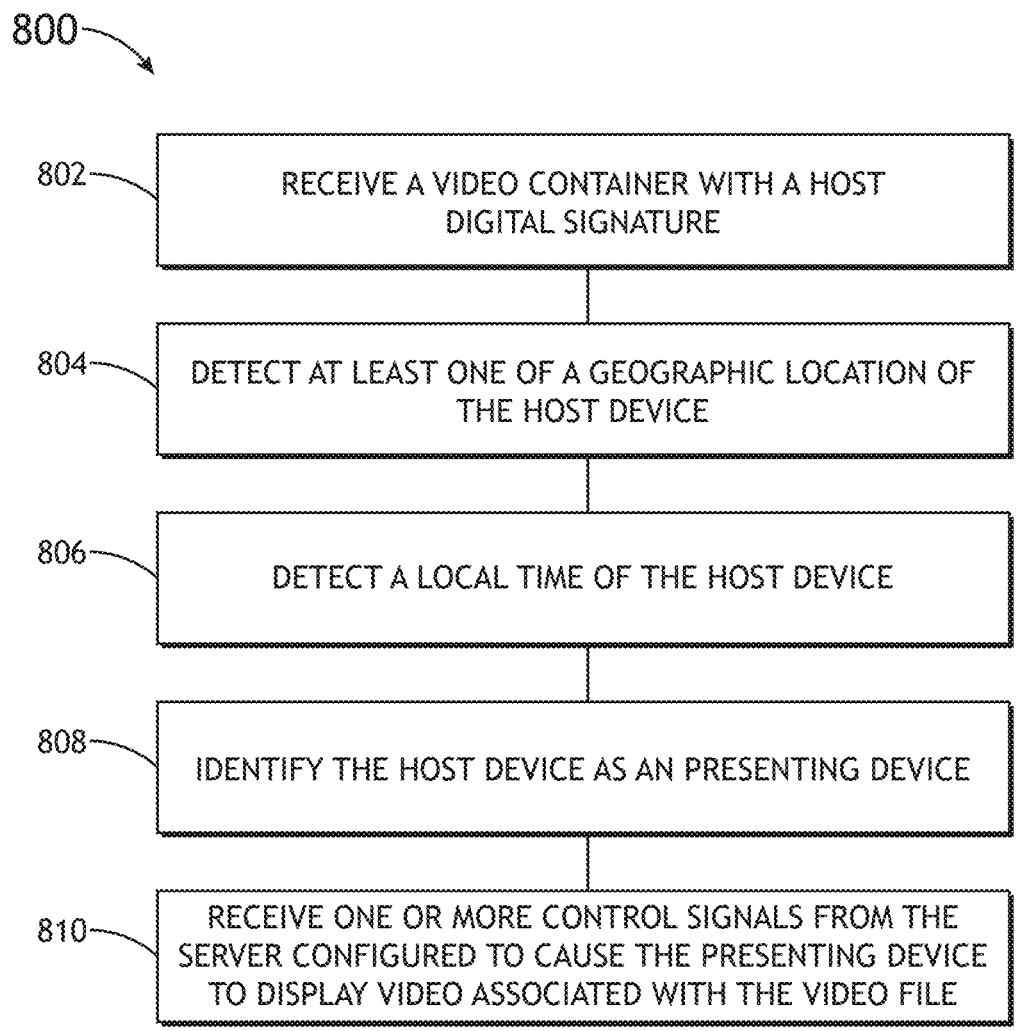
FIG. 8 illustrates a flow diagram depicting a method for displaying a video to a group of people via a host device, in accordance with one or more embodiments of the present disclosure.

FIG. 8 illustrates a flow diagram depicting a method 800 for facilitating an audio-visual work to a group of people via the host device 110. It is noted herein that the steps of method 800 may be implemented all or in part by system 100. It is further recognized, however, that the method 800 is not limited to the system 100 in that additional or alternative system-level embodiments may carry out all or part of the steps of method 800

In a step 802, the host device 110 receives the video container 114 including the host digital signature 116. The video container 114 may include a video file. In embodiments, the video file may be associated with a corresponding audio file. For example, the video of an audio-visual work may be stored in the video file, while the audio of the audio-visual work may be stored in a corresponding audio file.

In a step 804, the host device 110 may detect a geographic location of the host device 110. It is contemplated herein that the geographic location of the host device 110 may be determined using location circuitry of the host device 110. For example, the geographic location of the host device 110 may be determined using one or more GPS signals associated with the location of the host device 110. For instance, the location of the host device 110 may be determined based on gyroscopic data associated with the host device 110.

In a step 806, the host device 110 may detect a local time for the host device 110. It is contemplated herein that the local time of the host device 110 may be determined using location circuitry of the host device 110. For example, the local time of the host device 110 may be determined using the internal clock feature of the host device 110.

In a step 808, the host device 110 may be identified as a presenting device 212. For example, the server 104 may be configured to compare a location of the host device 110 and a pre-defined geographic location of the event 200, where a host device 110 that is located at the geographic location of the event 200 during the time and date of the event 200 may be considered a presenting device 212.

In a step 810, the host device 110 may receive one or more control signals from the server 104 configured to cause the presenting device 212 to display video associated with the video file. For example, the one or more control signals may be configured to cause the presenting device 212 to automatically begin displaying the video file. By way of another example, the one or more control signals may be configured to cause the presenting device 212 to display the video file based on one or more inputs from the host 202 (e.g., pressing a play button to begin the display, or the like).

Figure 9:
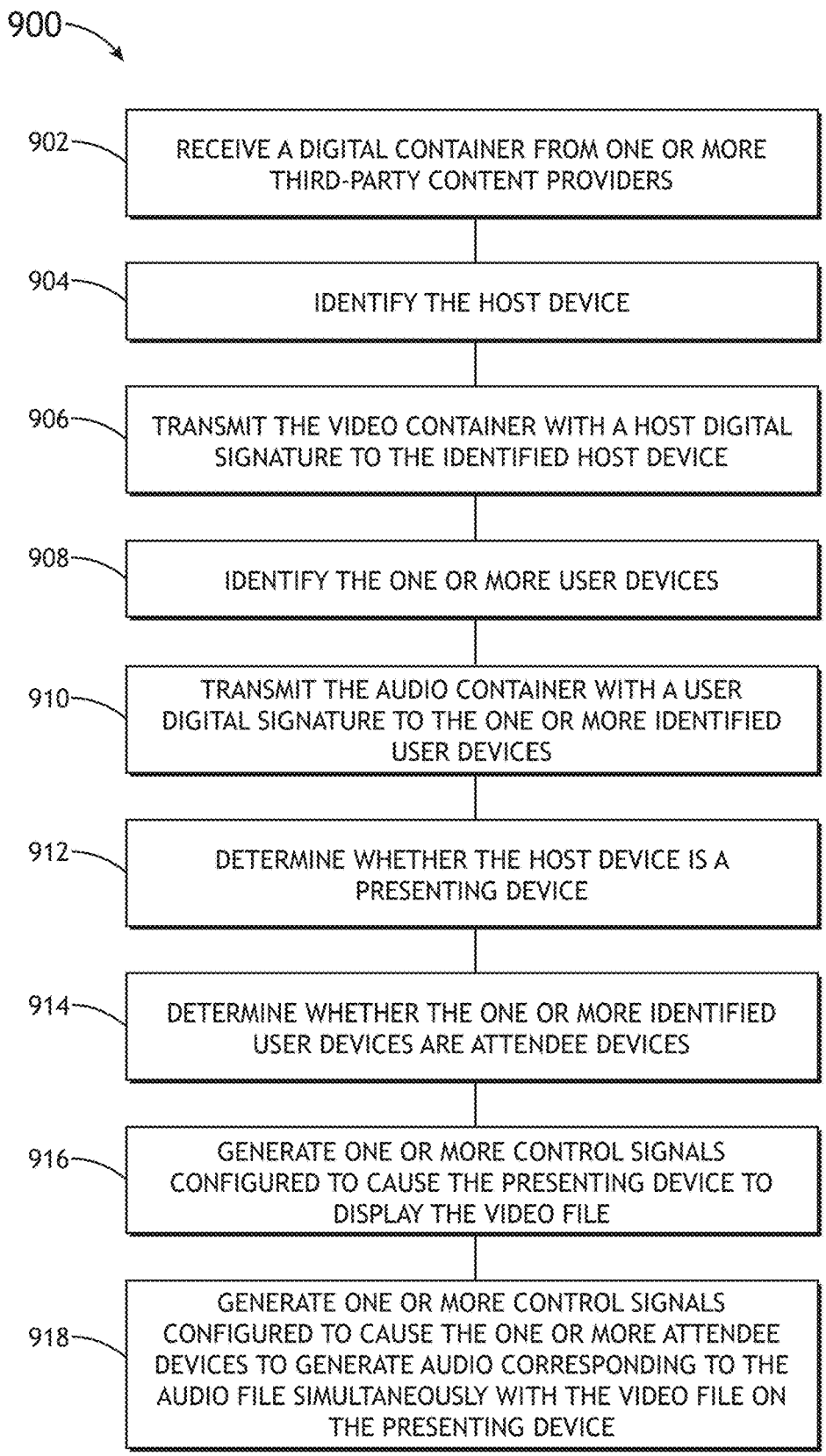
FIG. 9 illustrates a flow diagram depicting a method for displaying video to a group of people via a host device, in accordance with one or more embodiments of the present disclosure.

FIG. 9 illustrates a flow diagram depicting a method 900 for a facilitating an audio-visual work to a group of people, in accordance with one or more embodiments of the present disclosure. It is noted herein that the steps of method 900 may be implemented all or in part by system 100. It is further recognized, however, that the method 900 is not limited to the system 100 in that additional or alternative system-level embodiments may carry out all or part of the steps of method 900.

In a step 902, a digital container 108 may be received from one or more third-party content providers 106. For example, the digital container 108 may include an audio-visual work saved into a digital format, such as Audio Video Interleave (AVI), Quicktime, WebM, Windows Media Video or the like. The digital container 108 may include a video container 114, associated with a video file, and an audio container 118, associated with an audio file.

In a step 904, the host device 110 may be identified. The server 104 may identify whether the host device 110 is authorized to download video container 114. For example, the server 104 may be configured to determine whether the device in question has been registered as a host device 110. By way of another example, the server 104 may be configured to determine whether the device in question has have chosen the parameters (e.g., time and location) to organize the event 200.

In a step 906, the video container 114 may be transmitted with a host digital signature 116 to the identified host device 110.

In a step 908, the one or more user devices 112 may be identified. For example, a user device 112 which is authorized to download the audio container 118 may identified. For instance, the server 104 may be configured to determine whether the device in question has been registered as a user device 112 to the server 104, and has indicated that they are authorized to attend the event.

In a step 910, the audio container 118 may be transmitted, or digitally sent, with a user digital signature 120 to the one or more identified user devices 112.

In a step 912, the host device 110 may be determined to be a presenting device 212. For example, the location of the host device 110 may be compared to a pre-defined geographic location of the event 200. When a host device 110 is located at the geographic location of the event 200 during the time and date of the event 200, the host device 110 may be considered a presenting device 212.

In a step 914, the user device 112 may be determined to be an attendee device 210. For example, the location of the user device 112 may be compared to a pre-defined geographic location of the event 200. When a user device 112 is located at the geographic location of the event 200 during the time and date of the event 200, the user device 112 may be considered an attendee device 210.

In a step 916, one or more control signals configured to cause the presenting device 212 to display the video file may be generated. For example, the one or more control signals may be configured to cause the presenting device 212 to automatically begin displaying the video file. By way of another example, the one or more control signals may be configured to cause the presenting device 212 to display the video file based on one or more inputs from the host 202 (e.g., pressing a play button to begin the display, or the like).

In a step 918, one or more control signals configured to cause the one or more attendee devices 210 to generate audio corresponding to the audio file simultaneously with the video file on the presenting device 212 may be generated. For example, the one or more control signals may be configured to cause the one or more attendee devices 210 to automatically generate audio associated with the audio file. In embodiments, the one or more control signals may be configured to cause the one or more attendee devices 210 to generate the audio simultaneously with the displayed video associated with the presenting device 212. By way of another example, the one or more control signals may be configured to cause the attendee device 210 to generate audio associated with the audio file based on one or more inputs from the host 202 (e.g., pressing a play button to begin the display, or the like).

Referring back to FIG. 1, it is noted herein that the one or more components of system may be communicatively coupled to the various other components of system 100 in any manner known in the art. For example, the one or more components of the system (e.g., servers, controllers, user devices, processors, and the like) may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth, 3G, 4G, 4G LTE, 5G, and the like).

The one or more processors may include any one or more processing elements known in the art. In this sense, the one or more processors may include any microprocessor-type device configured to execute software algorithms and/or instructions. In one embodiment, the one or more processors may consist of a desktop computer, mainframe computer system, workstation, image computer, parallel processor, or other computer system (e.g., networked computer) configured to execute a program configured to operate the system, as described throughout the present disclosure. It should be recognized that the steps described throughout the present disclosure may be carried out by a single computer system/server or, alternatively, multiple computer systems/servers. Furthermore, it should be recognized that the steps described throughout the present disclosure may be carried out on any one or more of the one or more processors. In general, the term "processor" may be broadly defined to encompass any device having one or more processing elements, which execute program instructions from memory. Moreover, different components/sub-systems of the system (e.g., user devices 112, server 104, host device 110, and the like) may include processor or logic elements suitable for carrying out at least a portion of the steps described throughout the present disclosure. Therefore, the above description should not be interpreted as a limitation on the present disclosure but merely an illustration.

The memory may include any storage medium known in the art suitable for storing program instructions executable by the associated one or more processors. For example, the memory may include a non-transitory memory medium. For instance, the memory may include, but is not limited to, a read-only memory (ROM), a random-access memory (RAM), a magnetic or optical memory device (e.g., disk), a magnetic tape, a solid-state drive and the like. It is further noted that memory may be housed in a common controller housing with the one or more processors. In an alternative embodiment, the memory may be located remotely with respect to the physical location of the processors, servers, controllers, and the like. In another embodiment, the memory maintains program instructions for causing the one or more processors to carry out the various steps described through the present disclosure.

The one or more user devices 112 may include one or more display devices and one or more user input devices.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
a server communicatively coupled to a host device, one or more user devices, and one or more third-party content providers, wherein the server is configured to:

receive a digital container from the one or more third-party content providers, wherein the digital container includes an audio container and a video container, wherein the audio container comprises an audio file and the video container comprises a video file corresponding to the audio file;

identify the host device;

transmit the video container with a host digital signature to the identified host device, wherein the host digital signature comprises at least one of a host ID, time data and location data;

identify the one or more user devices;

transmit the audio container with a user digital signature to the one or more identified user devices, wherein the user digital signature comprises at least one of a user ID, time data and location data;

determine whether the host device is a presenting device by comparing a geographic location of the host device to the location data of the host digital signature and comparing a local time of the host device to the time data of the host digital signature;

determine whether the one or more identified user devices are one or more attendee devices, wherein the one or more attendee devices are the one or more user devices in which the geographic location of the user device matches the location data of the user digital signature and the local time of the user device matches the time data of the user digital signature;

generate one or more control signals configured to cause the presenting device to display the video file; and generate one or more control signals configured to cause the one or more attendee devices to generate audio corresponding to the audio file simultaneously with the video file on the presenting device.

2. The system of claim 1, wherein the server is further configured to erase the video container from the presenting device upon generating one or more control signals configured to cause the presenting device to erase the video file.

3. The system of claim 1, wherein the server is further configured to erase the audio container from the one or more attendee devices upon generating one or more control signals configured to cause the presenting device to erase the audio file.

4. The system of claim 1, wherein the server is further configured to:

receive user data from the one or more user devices.

5. The system of claim 4, wherein the server is configured to receive the user data from the one or more user devices upon generating the one or more control signals configured to cause the one or more attendee devices to generate audio corresponding to the audio file.

6. The system of claim 4, wherein the user data comprises:

one or more microphone recordings, wherein the one or more microphone recordings are obtained from a microphone on the one or more user devices.

7. The system of claim 6, wherein the microphone on the one or more user devices records an ambient sound measurement and a measure of the audio generated from the corresponding audio file.

8. The system of claim 7, wherein the server is configured to:

receive the ambient sound measurement and the measure of the audio generated; and calculate a difference between the ambient sound measurement and the measure of the audio generated.

9. The system of claim 6, wherein the microphone on the one or more user devices records one or more sounds wherein the one or more sounds comprises at least one of laughing, yelling, gasping, crying, or cheering.

10. The system of claim 1, wherein the server is configured to receive the geographic location of the one or more user devices from one or more GPS signals associated with the one or more user devices.

11. A system comprising:

a user device communicatively coupled to a server, wherein the user device is configured to:

receive an audio container with a user digital signature from the server, wherein the audio container includes an audio file corresponding to a video container, wherein the user digital signature comprises at least one of a user ID associated with the user device, time data, or location data;

determine at least one of a geographic location of the user device;

determine a local time of the user device;

compare the geographic location of the user device with the location data of the user digital signature;

compare the local time of the user device with the time data of the user digital signature;

upon determining the geographic location of the user device matches the location data of the user digital signature and the local time of the user device matches the time data of the user digital signature, identify the user device as an attendee device; and receive one or more control signals from the server configured to cause the attendee devices to generate audio corresponding to the audio associated with the audio file simultaneously with a display of a corresponding video file from the corresponding video container.

12. The system of claim 11, wherein the user device is further configured to receive one or more control signals configured to cause the server to remove the audio container from the user device.

13. The system of claim 11, wherein the user device is further configured to:

collect user data; and provide the user data to the server.

14. The system of claim 13, wherein the user data comprises microphone recordings, wherein the microphone recordings are obtained from a microphone on the user device while the user device.

15. The system of claim 13, wherein the user data comprises device movement, wherein the device movement is obtained from at least one of one or more GPS signals associated with the user device or user device gyroscope.

16. The system of claim 11, wherein the audio container comprises closed captioning data, wherein the user device is configured to display the closed captioning data on the user device simultaneously with the corresponding video file on a presenting device.

17. The system of claim 11, wherein the audio container comprises an alternative language audio file, wherein the user device is configured to generate audio associated with the alternative language audio file simultaneously with a display of the corresponding video file from a presenting device.

18. A system, comprising:

a host device communicatively coupled to a server, wherein the host device is configured to:

receive a video container with a host digital signature from the server, the video container comprising a video file associated with a corresponding audio file, wherein the host digital signature comprises at least one of a host ID associated with the host device, time data, or location data;

determine at least one of a geographic location of the host device;

determine a local time of the host device;

compare the geographic location of the host device with the location data of the host digital signature;

compare the local time of the host device with the time data of the host digital signature;

upon determining the geographic location of the host device matches the location data of the host digital signature and the local time of the host device matches the time data of the host digital signature, identify the host device as a presenting device; and receive one or more control signals from the server configured to cause the presenting devices to display video associated with the video file.

19. The system of claim 18, wherein the host device is further configured to receive one or more control signals configured to cause the server to remove the video container from the host device.

20. The system of claim 18, wherein the host device is communicatively coupled to a display device.

21. The system of claim 20, wherein the display device comprises a projector and screen.

22. A method comprising:

receiving a digital container from one or more third-party content providers, wherein the digital container includes an audio container and a video container, wherein the audio container comprises an audio file and the video container comprises a video file corresponding to the audio file;

identifying a host device;

transmitting the video container with a host digital signature to the identified host device, wherein the host digital signature comprises at least one of a host ID, time data, or location data;

identifying one or more user devices;

transmitting the audio container with a user digital signature to the one or more identified user devices, wherein the user digital signature comprises at least one of a user ID, time data, or location data;

determining whether the host device is a presenting device by comparing a geographic location of the host device to the location data of the host digital signature and comparing a local time of the host device to the time data of the host digital signature;

determining whether the one or more identified user devices are attendee devices, wherein the attendee devices are the one or more user devices in which the geographic location of the user device matches the location data of the user digital signature and the local time of the user device matches the time data of the user digital signature;

generating one or more control signals configured to cause the presenting device to display the video file; and generating one or more control signals configured to cause the one or more attendee devices to generate audio corresponding to the audio file simultaneously with the video file on the presenting device.

* * * * *